Jan. 14, 1936.   H. F. JEFFERSON   2,027,867
ELECTRIC MOTOR
Filed May 28, 1934
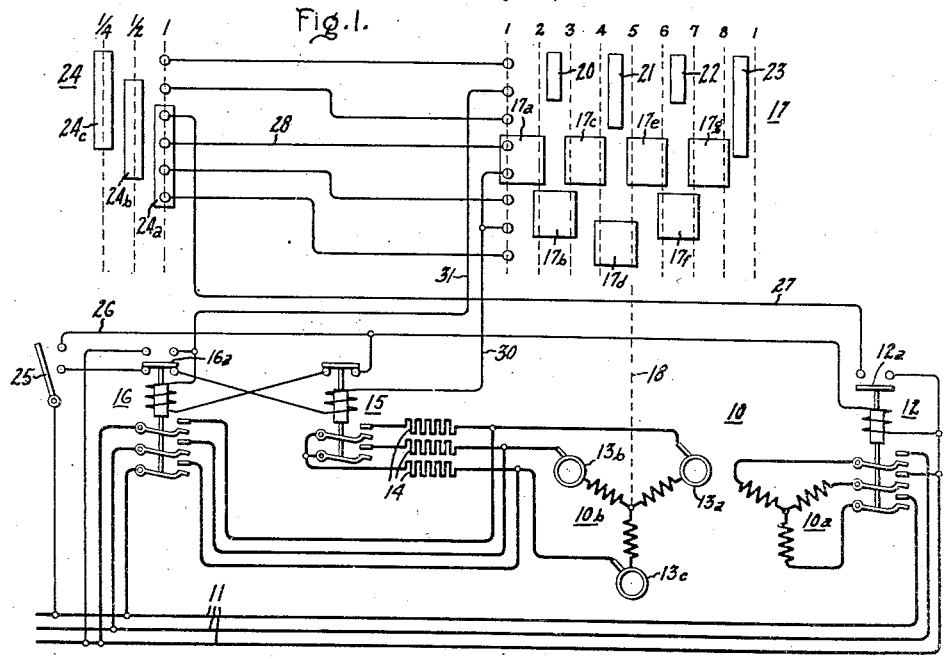
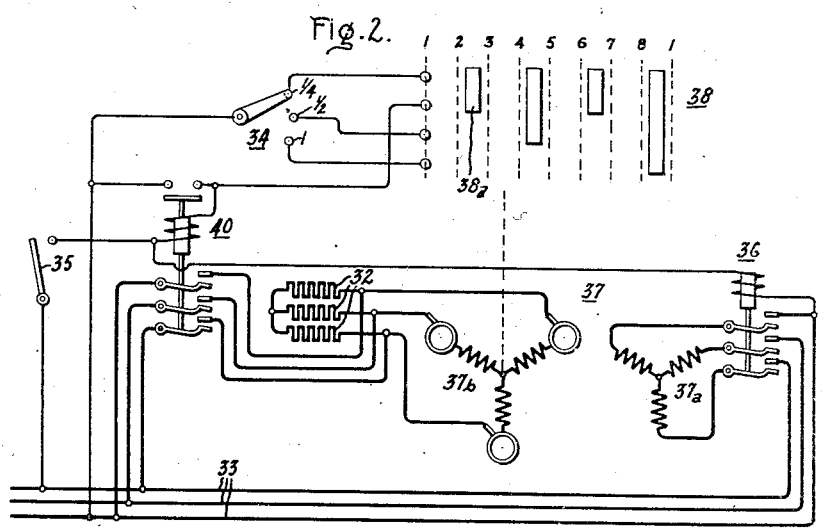
Inventor:
Harold F. Jefferson,
by Harry E. Dunham
His Attorney.

Patented Jan. 14, 1936

2,027,867

UNITED STATES PATENT OFFICE 2,027,867

ELECTRIC MOTOR

Harold F. Jefferson, Rugby, England, assignor to General Electric Company, a corporation of New York Application May 28, 1934, Serial No. 728,023
In Great Britain June 15, 1933

9 Claims. (Cl. 172—239)

This invention relates to electric motors and their control for driving motions requiring intermittent operation through definite predetermined amounts, such as is the case with the feed motions to the tool holders or boxes of machine tools.

The invention consists in providing means for causing the rotating part of a polyphase alternating current motor, to turn through an amount equal to the spacing of a pair of poles or multiples of a pair, the rotating portion being brought to rest in the desired position by magnetic locking of poles on the stationary and on the rotating parts.

In carrying this invention into effect in one form thereof, the motor may be similar in form to an ordinary slip-ring induction motor, being provided with a wound stator and a wound rotor, the winding of which is connected to slip-rings together with means for connecting the primary winding to a source of voltage and means for subsequently energizing the secondary winding to effect magnetic locking of the stator and rotor and thus to stop the motor.

By the provision of a suitable switch, drum controller, or similar device, driven by the motor itself, the connections may be so arranged that on completing a control circuit the stator winding will be connected to the supply and the rotor slip-rings may be connected together, either by being short circuited or through a resistance. This in effect causes the machine to operate as an ordinary induction motor, and the rotor will begin to rotate. As the rotor approaches the position in which it is to be brought to rest, the switch or drum controller causes the slip-rings to be connected to the supply. In the case of the rings having been short circuited, the short circuiting connections must, of course, be opened first, but in the case where the rings have been connected through a resistance, the latter may remain connected provided it is of such a value that the current through it on applying the supply to the slip-rings, is a reasonable amount. The effect of connecting the slip-rings, and hence the rotor windings, to the supply will be to produce a magnetic field in the rotor. This field will, however be out of phase with the stator field, unless the poles of the rotor and stator coincide, and will cause a torque to be exerted which will pull the rotor round until the poles on stator and rotor coincide, and will then hold the rotor magnetically locked in this position, for if the rotor poles moved past this position of coincidence a torque would be exerted in the reverse direction to bring it back to this position.

For a better and more complete understanding of the invention reference should now be had to the following specification and to the accompanying drawing of which Fig. 1 is a simple diagrammatical representation of an embodiment of the invention, and Fig. 2 is a simple diagrammatical representation of a modification.

Referring now to the drawing, an alternating current motor 10 is provided with a polyphase primary winding 10a and a polyphase secondary winding 10b. The primary winding 10a is assumed to be the stator winding and the secondary winding 10b is assumed to be the rotor winding, although the opposite arrangement may be assumed if desired. As is well understood, these windings are distributed on the stator and rotor members to provide a predetermined number of poles. In the present case, it will be assumed that these windings are so distributed as to provide eight magnetic poles.

Alternating voltage is supplied to the primary winding 10a from a suitable polyphase source, represented in the drawing by the three supply lines 11 to which the terminals of the primary winding are arranged to be connected by suitable means illustrated as an electromagnetically actuated contactor 12. The terminals of the secondary winding 10b are respectively connected to slip-rings 13a, 13b and 13c, which in turn are respectively connected to the terminals of a secondary resistance 14.

A suitable contactor 15 is provided for establishing a Y-point for the secondary winding. Suitable switching means illustrated as an electromagnetically actuated contactor 16 are provided for connecting the terminals of the secondary winding 10b to the polyphase source 11. The connections are so chosen that the rotating magnetic field of the secondary winding rotates in the same direction in space as the rotating magnetic field of the primary winding.

Switching means illustrated in the form of a drum controller 17 connected to be driven by the motor 10 as indicated by the dotted connection 18 are provided for controlling the operation of the contactor 16. This drum controller 17 is provided with a plurality of segments 20, 21, 22 and 23 arranged on the drum in positions corresponding respectively to ¼, ½, ¾ and 1 complete rotation of the rotor of the motor 10. Means illustrated as a switching device 24 and associated control circuits are provided for cooperating with the switching means to preselect the desired amount of rotation of the motor 10 and to stop the latter at the desired limit of operation. A pilot switching device 25 is provided for initiating a desired operation.

With the above understanding of the various elements and their association and organization in the completed system, the operation of the system itself will readily be understood from the following description:

On closing the operating switch 25, a circuit is completed through the coil of the contactor 12. This circuit is readily traced from the upper supply line 11 through the movable and upper stationary contacts of the switch 25, conductor 26, and coil of contactor 12 to the lower supply line 11. The contactor 12 closes in response to energization and connects the stator winding 10a of the motor to the supply source 11.

Assuming the selector switch 24 to be turned to the position calling for one complete rotation of the motor 10, as illustrated in the drawing, the closing of the upper auxiliary contacts 12a of the contactor 12 completes an energizing circuit for the contactor 15, that is traced from the lower supply line 11, through the auxiliary contacts 12a of the contactor 12, conductor 27, third and fourth fingers of the selector switch 24 bridged by the segment 24a, conductor 28, fourth and fifth fingers of the drum controller 17 bridged by the segments 17a, conductor 30, operating coil of contactor 15, lower interlock contacts of contactor 16 bridged by movable contacts 16a, through contacts of switch 25 to the upper side of the supply source 11. The contactor 15 closes in response to the energization of its operating coil and establishes a Y-point for the rotor windings of the motor 10 through the resistances 14. The motor will now begin to rotate as an ordinary induction motor. Since the segments 17a to 17g of the drum controller are overlapping in the manner illustrated in the drawing, an unbroken circuit is provided for the operating coil of the contactor 15 until the position 8 has been passed. In this position the motor has completed 7/8 of one complete revolution. As this position on the controller is passed, the energizing circuit for the coil of contact 15 is interrupted. The contactor 15 opens thereby interrupting the Y-connections of the rotor winding. However, the inertia of the rotor will maintain it in rotation until the second and fourth (from the top) fingers of the drum controller 17 are bridged by the segment 23. This completes an energizing circuit for the contactor 16, which circuit is traced from the upper supply line 11 to the conductor 26 as before, then through the closed interlock of the contactor 15, coil of contactor 16, conductor 31, second and fourth fingers of drum controller 17 bridged by segment 23, conductor 28, third and fourth fingers of selector switch 24 bridged by segment 24a and thence by conductor 27 and auxiliary contacts 12a to the lower side of the supply source.

The contactor 16 closes in response to energization and connects the rotor winding 10b to the supply source 11. A rotating magnetic field is now produced by the rotor winding which is slightly out of phase with the rotating magnetic field of the stator winding. As a result a torque is exerted on the rotor which pulls the latter into step with the rotating magnetic field of the stator winding so that the magnetic poles of both the rotor and stator windings are in phase. It is observed that the contactor 16 is provided with stationary upper auxiliary contacts through which a holding circuit for the operating coil is completed when bridged by the movable contact 16a in the closed position of the contactor. This holding circuit is independent of the segments of the drum switch 17 so that the contactor 16 remains closed as the segment 23 passes out of engagement with the stationary fingers of the controller 17 between positions 8 and 1. As the drum controller 17 is rotated into its first position, the Y-contactor 15 cannot be reclosed because its energizing circuit passes through the lower interlocking contacts of the contactor 16 which are opened as long as the contactor 16 is closed. Thus, the rotating magnetic fields of the stator and rotor windings remain locked and the motor is stopped and locked in this position. On opening the pilot switch 25, all the contactors open and on reclosing the pilot switch 25, the above-described cycle of operation is repeated.

By moving the selector switch to the position marked ½, it will be observed that the motor will be brought to rest every half revolution and in the position marked ¼ it will be brought to rest every quarter revolution.

It will be understood that the resistances 14 may be varied in value or omitted, and that resistances may be inserted in the connections between the supply source and the rotor to suit the rotor resistance and line voltage and the torque required.

In the modification of Fig. 2, the rotor resistances 32 are permanently connected to the slip-rings. The ohmic values of these resistances and that of the rotor, are so chosen that while the required torque is obtained, the current flowing in the resistances 32 will not be excessive when connected to the supply source 33.

The selector switch 34 is shown in the position in which the rotor will come to rest every quarter revolution in the case of an eight pole machine. On closing the pilot switch 35 an energizing circuit is completed for the operating coil of the contactor 36 which closes and connects the stator winding 37a of the motor 37 to the supply source 33. Since the rotor windings 37b are connected to a Y-point through the resistances 32, the motor will start to rotate. Just after the motor has rotated the drum controller 38 past the position 2 (⅛ of a revolution), an energizing circuit is completed through the coil of contactor 40 by way of the first and second fingers of the drum controller 38 bridged by the segments 38a. The contactor 40 closes in response to energization and connects the rotor windings 37b of the motor to the polyphase supply source 33. As in the system of Fig. 1, a rotating magnetic field is produced in the rotor winding in addition to that in the stator winding, and until these two fields come into phase with each other a torque will be exerted on the rotor which will pull the latter into step with the rotating magnetic field of the stator winding so that both magnetic fields are brought into phase with each other. When the poles of these two fields come into phase, the torque exerted on the rotor disappears and the motor will be locked.

On opening the pilot switch 35, the contactors will open, and on reclosing, the cycle of operation just described, will be repeated, the field phasing feature coming into operation whenever the fingers of the drum controller are engaged by one of the movable segments.

With the movable contacts of the selector switch 34 on the point marked ½, the motor will be brought to rest every half revolution, and with the contacts of the selector switch on the point marked 1, the motor will be brought to rest every complete revolution.

It will of course be understood that it may be necessary to insert resistances, choke coils, or other similar devices in the various circuits to obtain the desired torque in the motor and to limit the current flowing to a reasonable value.

It will also be apparent that different combinations of the amounts of rotation may be obtained by using a different number of poles on the motor windings, for example, a six pole machine will provide locking at every 1/3 of a revolution.

It will also be clear that by the use of suitable gear ratios between the motor and the switch or drum controller, together with the correct spacing of the contacts, a large number of combinations of amounts of rotation may be obtained all the way from fractions of a single revolution to any specified number of complete revolutions.

Although in accordance with the provisions of the patent statutes this invention is described as embodied in concrete form, it will be understood that the specific apparatus and connections shown and described are merely illustrative and that the invention is not limited thereto since alterations and modifications will readily suggest themselves to persons skilled in the art without departing from the true spirit of this invention or the scope of the annexed claims.

What I claim as new and desire to secure by Letters Patent of the United States, is:—

1. In combination an alternating current motor having primary and secondary windings, means for supplying polyphase alternating voltage to one of said windings and means for providing a closed circuit for the other of said windings to provide motoring operation, and means responsive in predetermined rotational positions of said motor for connecting the other of said windings to a source of polyphase voltage thereby to stop said motor with said primary and secondary windings in predetermined relationship with each other.

2. In combination an alternating current motor having rotor and stator windings, means for connecting one of said windings to a source and means providing a closed circuit for the other of said windings to provide motoring operation, and means controlled by the operation of said motor for conecting the other of said windings to said source to stop said motor after a predetermined amount of rotation.

3. A control system comprising an alternating current motor having polyphase stator and rotor windings, switching means for connecting one of said windings to a source and means for connecting the other of said windings in a closed circuit to provide for rotation of said motor, and means operated by said motor for connecting the other of said windings to said source thereby to lock the rotor and stop the motor with said windings in predetermined relationship with each other.

4. A control system comprising an alternating current motor having polyphase stator and rotor windings, switching means for connecting one of said windings to a source of alternating voltage and means for providing a closed circuit for the other of said windings to effect rotation of said motor, switching means for connecting the other of said windings to said source, and a controller operated by said motor for actuating said last mentioned switching means to lock said stator and rotor windings and stop said motor after a predetermined amount of rotation.

5. A control system comprising an alternating current motor having primary and secondary windings, a master device for selecting predetermined amounts of rotation for said motor, means for connecting one of said windings to a source of supply and means providing a closed circuit for the other of said windings so as to produce motoring operation, and means responsive to a selected amount of rotation of said motor for connecting the other of said windings to a source to produce magnetic locking of said windings thereby to stop said motor after a predetermined rotation.

6. A control system comprising an alternating current motor having polyphase stator and rotor windings, switching means for connecting one of said windings, to a polyphase source of alternating voltage and means providing a closed circuit for the other of said windings to effect rotation of the rotor, switching means for connecting the other of said windings to said source to effect stopping of said motor at predetermined limits of operation, and means for selecting the limit at which said last mentioned switching means becomes effective.

7. A control system comprising an alternating current motor having polyphase primary and secondary windings, means for connecting one of said windings to a source of alternating voltage and means providing a closed circuit for the other of said windings to effect rotation of said motor, switching means provided with a plurality of contacts for controlling the connection of the other of said windings to said source to effect magnetic locking of said windings and stopping said motor in different fractional rotational positions, and a multi-position switching device cooperating with said switching means for effecting stopping at a selected position of fractional rotation.

8. A control system comprising in combination an alternating current motor having polyphase primary and secondary windings, means for connecting said primary winding to a polyphase source and means providing a closed circuit for said motor to effect rotation of said motor, switching means for connecting said secondary winding to said source to effect magnetic locking of said windings and stopping of said motor, a multi position selector switching device for partially establishing an energizing circuit for said switching means, and a controller driven by said motor and having a plurality of contacts arranged in positions corresponding to predetermined amounts of rotation of said motor for cooperating with said selector switch to complete said energizing circuit and stop said motor at a selected limit of operation.

9. A control system comprising in combination an alternating current motor having a polyphase primary winding and a polyphase secondary winding, a secondary resistance for said motor, a contactor for connecting said primary winding to a polyphase source to effect rotation of said motor, a second contactor for connecting said secondary winding to said source independently of said resistance thereby to effect magnetic locking of said windings and stopping of said motor, a drum controller driven by said motor and having a plurality of contacts arranged in positions corresponding to different amounts of rotation of said motor, and a selector switch having a plurality of contacts for cooperating with said controller to actuate said second contactor to stop said motor after a selected amount of rotation.

HAROLD F. JEFFERSON.